United States Patent [19]
Sakata

[11] Patent Number: 6,046,766
[45] Date of Patent: Apr. 4, 2000

[54] CAMERA AND VEHICLE-SURROUNDINGS VISUAL-RECOGNITION APPARATUS USING THE SAME

[75] Inventor: Kazuki Sakata, Tokyo, Japan

[73] Assignee: Mitsubishi Denki Kabushiki Kaisha, Tokyo, Japan

[21] Appl. No.: 08/923,273

[22] Filed: Sep. 4, 1997

[30] Foreign Application Priority Data

Apr. 17, 1997 [JP] Japan ................................ 9-100572

[51] Int. Cl.[7] .................................................. H04N 7/18
[52] U.S. Cl. ........................ 348/148; 348/363; 348/366; 348/39
[58] Field of Search ................................... 348/148, 147, 348/218, 335, 363, 366, 39, 36; 351/49; 352/60, 61, 62; 359/472, 435; 250/208.1

[56] References Cited

U.S. PATENT DOCUMENTS

| | | | |
|---|---|---|---|
| 4,968,124 | 11/1990 | Deckert et al. | 359/435 |
| 5,642,106 | 6/1997 | Hancock et al. | 348/147 |
| 5,670,935 | 9/1997 | Schofield et al. | 348/148 |
| 5,680,123 | 10/1997 | Lee | 348/148 |
| 5,756,988 | 5/1998 | Furuta | 348/116 |
| 5,942,746 | 8/1999 | Tsai | 250/208.1 |

FOREIGN PATENT DOCUMENTS 8-85385  4/1996  Japan .

*Primary Examiner*—Wendy Garber
*Assistant Examiner*—Mitchell White
*Attorney, Agent, or Firm*—Sughrue, Mion, Zinn Macpeak & Seas, PLLC

[57] ABSTRACT

A camera provided with a housing having a plurality of entrance windows through each of which extraneous light rays are taken in, an image pickup device mounted in this housing, an optical element that is disposed in the housing and is operative to form images obtained from extraneous light rays taken in through the plurality of entrance windows on the imaging plane of the image pickup device, a light Shielding member that is provided in such a way as to be upright on the imaging plane of the image pickup device and to divide the imaging plane of the image pickup device into imaging fields on which images are respectively formed from the extraneous light rays taken in through the plurality of entrance windows, an aperture limitation remember that is placed in a stage preceding the light shielding member and has an aperture to limit the size of an incidence optical path of each of extraneous light rays from which images are formed on the imaging plane of the image pickup device, a diaphragm member that is disposed in the stage preceding the light shielding member in such a manner as to be able to move in a direction perpendicular to an optical axis and is operative to regulate the quantities of incident light of the imaging fields by overlapping with the aperture in the direction of the optical axis, and a drive unit for moving this diaphragm member in a direction perpendicular to the optical axis.

10 Claims, 11 Drawing Sheets

CAMERA AND VEHICLE-SURROUNDINGS VISUAL-RECOGNITION APPARATUS USING THE SAME

BACKGROUND OF THE INVENTION

1. Field of the Invention

This invention relates to a camera being capable of simultaneously imaging scenes respectively seen in a plurality of directions and to an apparatus for visual recognition of surroundings of a vehicle, which uses such a camera.

2. Description of the Related Art

FIG. 10 is a diagram illustrating an operation of a vehicle equipped with a conventional apparatus for visual recognition of surroundings of a vehicle.

Generally, when a motor vehicle 30 is about to come in an intersection, a region indicated by oblique lines in FIG. 10 becomes a driver's blind spot 32. Further, the driver cannot visually recognize other motor vehicles 31 that are present in left-side and right-side blind spots 32, respectively, as viewed in this figure.

Thus, to enable the driver to visually recognize the condition of the dead spot 32, there has been put to actual or practical use an apparatus for visual recognition of surroundings of the motor vehicle, in which a camera 50 is mounted on the front cover thereof and images of the left-side and right-side blind spots 32 are simultaneously taken by the camera 50 and thus the images of the blind spots 32 are displayed on the screen of a monitor television 40 as shown in FIG. 11.

Next, an example of the conventional camera will be described hereinbelow with reference to FIG. 12.

Outer casing 4 serving as a housing is provided with entrance windows 4a and 4b in the left and right side portions thereof, respectively, so that extraneous light coming from the right and left can be incident thereon. Further, an image formation lens 3 is mounted in the outer casing 4. Image pickup device 6 constituted by CCD is placed at a focal point of the image formation lens 3. Moreover, a pair of first mirrors 18a and 18b are disposed at the left and right sides of the image formation lens 3, respectively. Furthermore, a pair of second mirrors 19a and 19b are placed in such a manner as to face the first mirrors 18a and 18b, respectively.

In the case of a camera 50 configured in this manner, extraneous light 5a coming from the right (namely, from above as viewed in FIG. 12) is incident on the outer casing 4 through the entrance window 4a. First, the extraneous light 5a is reflected by the first mirror 18a. Subsequently, the extraneous light 5a is further reflected by the second mirror 19a. Then., the extraneous light 5a reflected by this second mirror 19a is led to the image formation lens 3, so that an inverted (or vertically-flipped) normal image is formed on the left-side half of an imaging plane (namely, an image pickup plane) of the image pickup device 6.

On the other hand, the extraneous light 5b coming from the left (namely, from below as viewed in FIG. 12) is incident on the outer casing 4 through the entrance window 4b. Then, the extraneous light 5b is first reflected by a first mirror 18b. Subsequently, the extraneous light 5b is further reflected by the second mirror 19b. The extraneous light 5b reflected by this second mirror 19b is led to the image formation lens 3, so that an inverted normal image is formed on a right half of the imaging plane of the image pickup device 6.

Thus, this camera 50 is applied to an apparatus for visual recognition of surroundings of a vehicle, a picture signal representing an inverted normal image, which is formed from light received by the image pickup device 6, is displayed on the screen of the monitor television 40 so that a scene, whose image is taken, is displayed in such a way as to be upside down. Thus, as illustrated in FIG. 11, a normal image formed from the extraneous light 5a coming from the right is displayed on the right-hand part of the screen of the monitor television 40. Further, another normal image formed from the extraneous light 5b coming from the left is displayed on the left-hand part of the screen of the monitor television 40. Thus, the driver can check the conditions of the left and right blind spots 32 from the screen of the monitor television 40.

In the case of this camera 50, a normal image is obtained by reflecting the extraneous light 5a (or 5b) two times by means of the first and second mirrors 18a and 19a (or 18b and 19b), namely, by changing an image, which is obtained as a mirror image by the first mirror 18a (or 18b), into the normal image by the use of the second mirror 19a (or 19b).

The conventional camera 50 is constructed as above described and thus can take (or shoot) images of regions respectively observed in a plurality of directions therefrom. However, the conventional camera 50 has a problem in that owing to the presence of the differences among illuminating angles of the sun or a lighting unit (namely, a luminaire), which respectively correspond to such regions, the image of the region corresponding to a certain direction is too bright, while that of the region corresponding to another direction is too dark.

Generally, in cameras, the luminance (brightness) of images of regions to be shot is controlled by diaphragm mechanisms or electronic shutters. Further, each of these diaphragm mechanisms and electronic shutters is operative to regulate the luminances of the entire images of such regions collectively. Thus, if these luminance control means are applied to the aforementioned camera 50, the luminances of the entire images of regions respectively corresponding to different directions are regulated collectively. Therefore, the camera 50 cannot solve the problem that the image of the region corresponding to a certain direction is too bright, while the image of the region corresponding to another direction is too dark.

SUMMARY OF THE INVENTION

The present invention is accomplished to solve the foregoing problem.

Accordingly, an object of the present invention is to obtain a camera adapted so that the quantities of incident light of a plurality of regions to be shot can be regulated independent of one another correspondingly to each of such regions and that images being easy to observe can be obtained by uniforming the luminances of the images of regions respectively corresponding to directions.

Further, another object of the present invention is to obtain an apparatus for visual recognition of surroundings of a vehicle, which is adapted so that the quantities of incident light of a plurality of regions to be shot can be regulated independent of one another correspondingly to each of such regions and that images being easy for a driver to observe can be obtained by uniforming the luminances of the images of regions respectively corresponding to directions.

To achieve the foregoing former object, in accordance with an aspect of the present invention, there is provided a camera that comprises: a housing having a plurality of entrance windows through each of which extraneous light rays are taken in; an image pickup device mounted in this housing; an optical element for forming images obtained from the extraneous light rays taken in through the plurality of entrance windows on an imaging plane of the image pickup device; a light shielding member that is provided in such a way as to be upright on the imaging plane of the image pickup device and to divide the imaging plane of the image pickup device into imaging fields on which images are respectively formed from the extraneous light rays (or beams) taken in through the plurality of entrance windows; an aperture limitation member which is placed in a stage preceding this light shielding member and has an aperture for limiting a size of an incidence optical path of each of extraneous light rays from which images are formed on the imaging plane of the image pickup device; a diaphragm member that is disposed in the stage preceding the light shielding member in such a manner as to be able to move in a direction perpendicular to an optical axis, for regulating the quantities of incident light of the imaging fields by overlapping with the aperture in the direction of the optical axis; and drive means for moving this diaphragm member in a direction perpendicular to the optical axis.

In accordance with another aspect of the present invention, there is provided another camera that comprises: a housing having a plurality of entrance windows, through each of which extraneous light rays are taken in; an optical element for forming images obtained from the extraneous light rays taken in through the plurality of entrance windows on an imaging plane of the image pickup device; a light shielding member that is provided in such a way as to be upright on the imaging plane of the image pickup device and to divide the imaging plane of the image pickup device into imaging fields on which images are respectively formed from the extraneous light rays (or beams) taken in through the plurality of entrance windows and that is constructed in such a manner as to be able to rock about an edge portion thereof which is at the side of the image plane; an aperture limitation member which is placed in a stage preceding this light shielding member and has an aperture for limiting a size of an incidence optical path of each of extraneous light rays from which images are formed on the imaging plane of the image pickup device; and drive means for rocking (or swinging) the light shielding member.

To achieve the foregoing latter object, in accordance with still another aspect of the present invention, there is provided an apparatus for visual recognition of surroundings of a vehicle, which comprises: a housing mounted in a front portion of a vehicle and provided with a plurality of entrance windows through each of which extraneous light rays are taken in from the surroundings of the vehicle; an image pickup device mounted in the housing so that an imaging plane thereof faces a region located in front of the vehicle; an optical element that is disposed in the housing and is operative to form images obtained from the extraneous light rays are taken in through the plurality of entrance windows on the imaging plane of the image pickup device; a light shielding member that is provided in such a way as to be upright on the imaging plane of the image pickup device and to divide the imaging plane of the image pickup device into imaging fields on which images are respectively formed from the extraneous light rays taken in through the plurality of entrance windows; an aperture limitation member which is placed in a stage preceding this light shielding member and has an aperture for limiting a size of an incidence optical path of each of extraneous light rays from which images are formed on the imaging plane of the image pickup device; a diaphragm member that is disposed in the stage preceding the light shielding member in such a manner as to be able to move in a direction perpendicular to an optical axis, for regulating the quantities of incident light of the imaging fields by overlapping with the aperture in the direction of the optical axis; drive means for moving this diaphragm member in a direction perpendicular to the optical axis; and display means for displaying an image signal representing the images formed on the imaging plane of the image pickup device.

In accordance with yet another aspect of the present invention, there is provided another apparatus for visual recognition of surroundings of a vehicle, which comprises: a housing mounted in a front portion of a vehicle and provided with a plurality of entrance windows through each of which extraneous light rays are taken in from the surroundings of the vehicle; an image pickup device mounted in the housing so that an imaging plane thereof faces a region located in front of the vehicle; an optical element that is disposed in the housing and is operative to form images obtained from the extraneous light rays are taken in through the plurality of entrance windows on the imaging plane of the image pickup device; a light shielding member that is provided in such a way as to be upright on the imaging plane of the image pickup device and to divide the imaging plane of the image pickup device into imaging fields on which images are respectively formed from the extraneous light rays taken in through the plurality of entrance windows and that is constructed in such a manner as to be able to rock about an edge portion thereof which is at the side of imaging plane; an aperture limitation member which is placed in a stage preceding this light shielding member and has an aperture for limiting a size of an incidence optical path of each of extraneous light rays from which images are formed on the imaging plane of the image pickup device; drive means for rocking (or swinging) the light shielding member; and display means for displaying an image signal respectively the images formed on the imaging plane of the image pickup device.

BRIEF DESCRIPTION OF THE DRAWINGS

Other features, objects and advantages of the present invention will become apparent from the following description of preferred embodiments with reference to the drawings in which like reference characters designate like or corresponding parts throughout, several views, and in which.

DETAILED DESCRIPTION OF THE PREFERRED EMBODIMENTS

Hereinafter, the preferred embodiments of the present invention will be described in detail by referring to the accompanying drawings.

Embodiment 1

Figure 1:
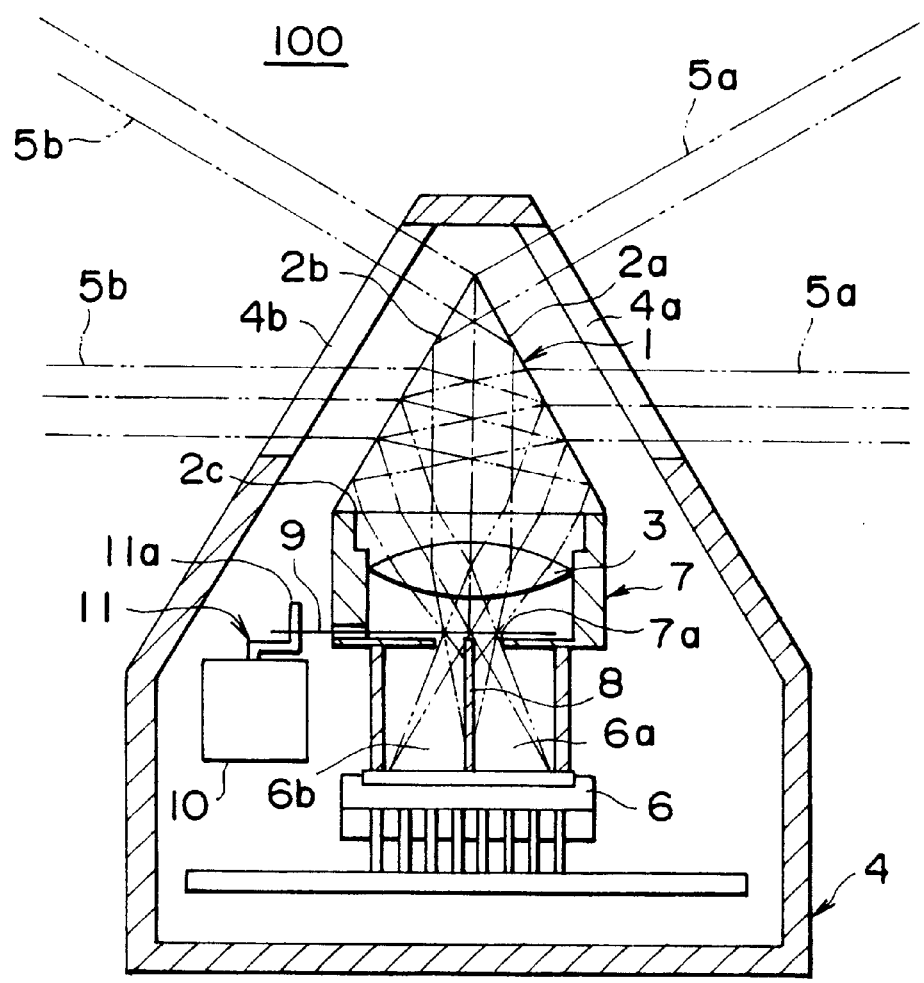
FIG. 1 is a sectional view of a camera in accordance with a first embodiment of the present invention.
Figure 2A:
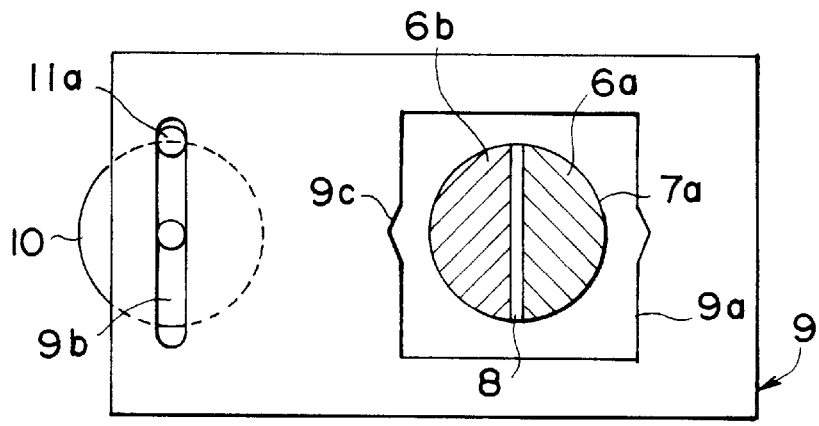
FIGS. 2A to 2C are diagrams for illustrating an operation of a diaphragm blade in this camera in accordance with the first embodiment of the present invention.
Figure 2B:
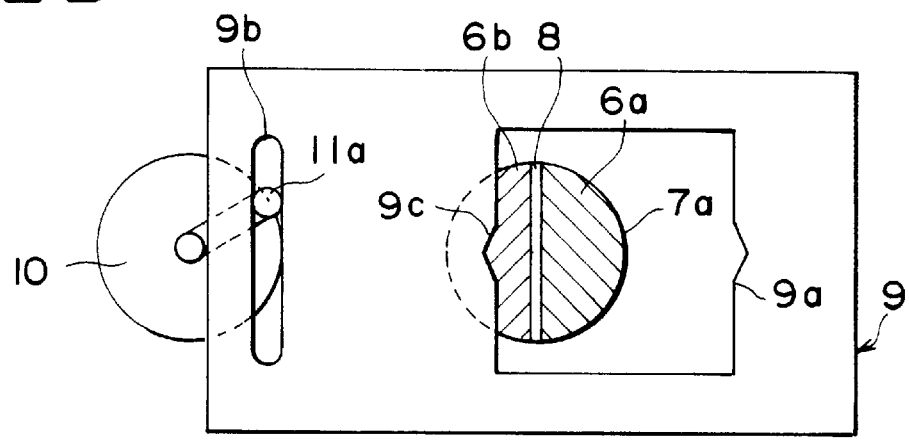
Figure 2C:
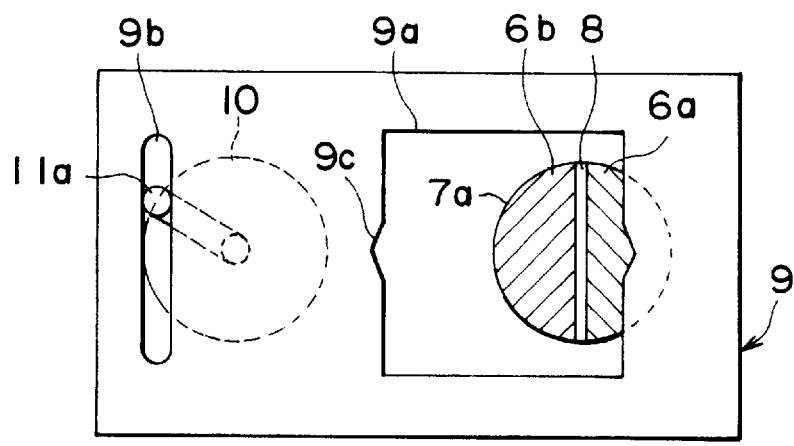
Figure 3:
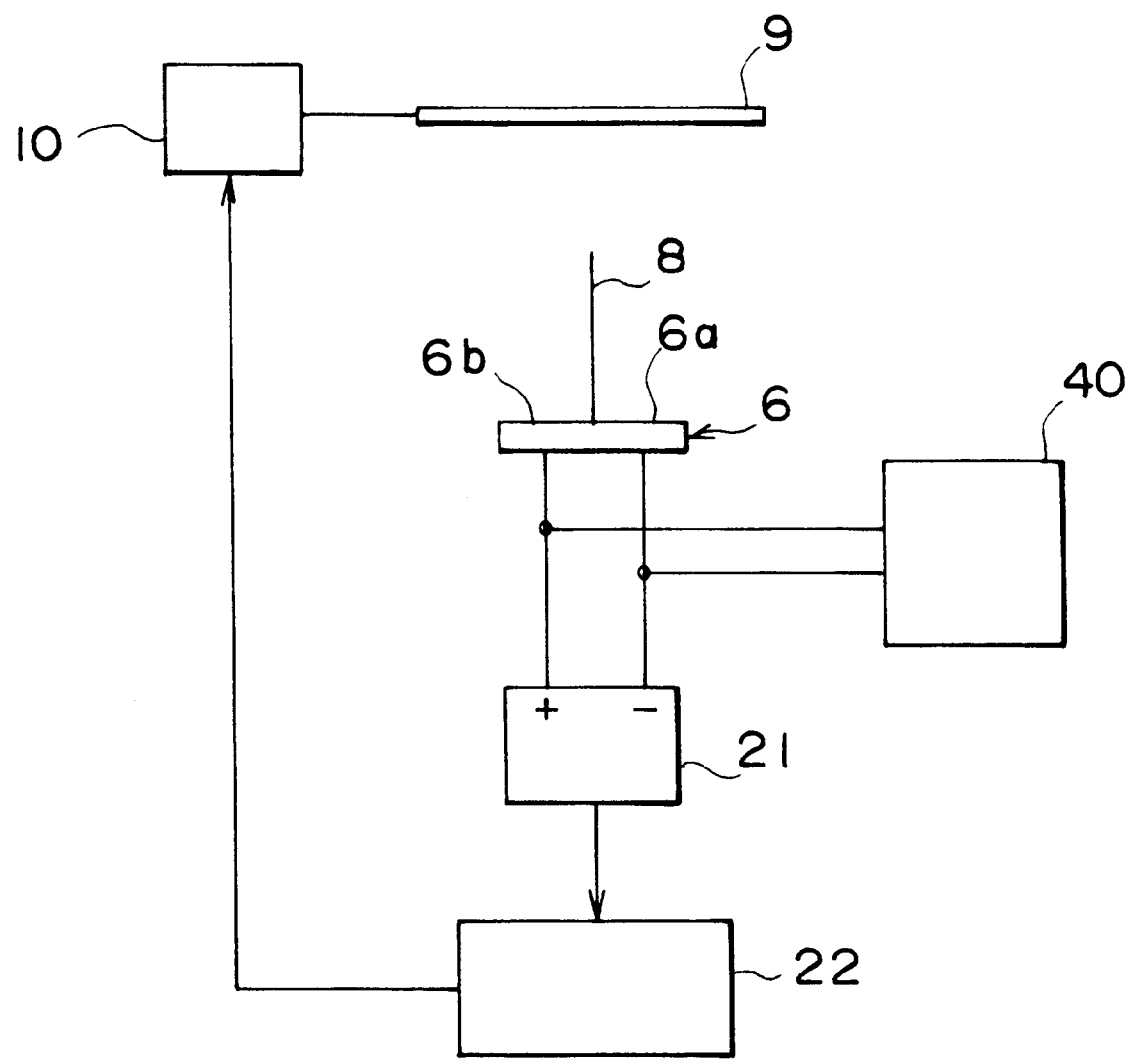
FIG. 3 is a block diagram illustrating a control system of this camera in accordance with the first embodiment of the present invention.
Figure 12:
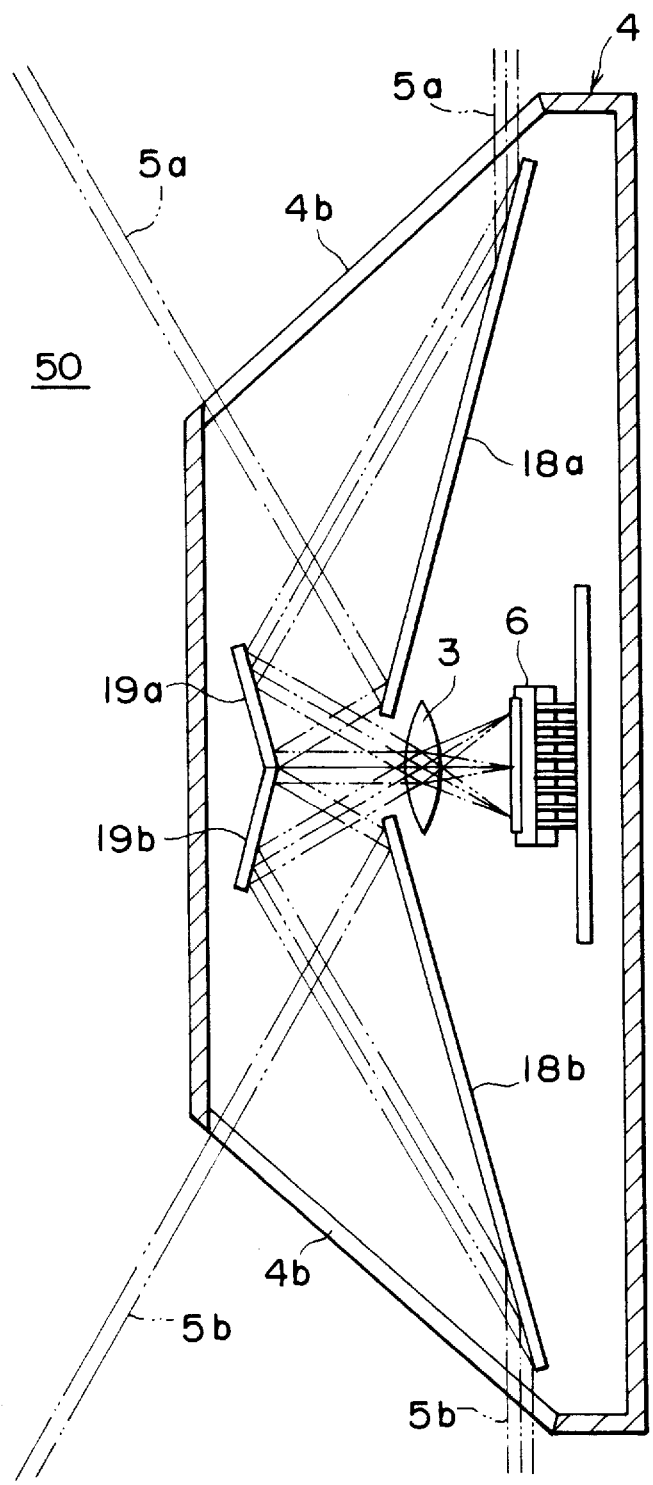
FIG. 12 is a sectional view of an example of the conventional camera.

FIG. 1 is a sectional view of a camera in accordance with a first embodiment of the present invention. FIGS. 2A to 2C are diagrams for illustrating an operation of a diaphragm blade in this camera in accordance with the first embodiment of the present invention. FIG. 2A illustrates the case that the quantity of incident light of a left-side imaging field is equal to that of incident light of a right-side imaging field; FIG. 2B the case that the quantity of incident light of the left-side imaging field is larger than that of incident light of the right-side imaging field; and FIG. 2C the case that the quantity of incident light of the right-side imaging field is larger than that of incident light of the left-side imaging field. FIG. 3 is a block diagram illustrating the control system of this camera in accordance with the first embodiment of the present invention. In each of these figures, like reference characters designate same or corresponding parts of the camera illustrated in FIG. 12. Further, the descriptions of such parts are omitted herein.

As shown in these figures, an outer casing 4 serving as a housing is provided with entrance windows 4a and 4b and is thus adapted so that extraneous light 5a coming from the right and extraneous light 5b coming from the left are incident thereon through the right-hand entrance window 4a and the left-hand entrance window 4b (as viewed in FIG. 1), respectively. Further, an image formation lens 3 is mounted in the outer casing 4, and an image pickup device 6 is disposed at a focal point of the image formation lens 3. Moreover, a prism 1 formed as a square pillar, whose section is shaped like an isosceles triangle, is disposed in a stage preceding the image formation lens 3. Furthermore, the prism 1 is placed so that the bisector of a vertex angle of the isosceles triangle coincides with an optical axis of the image formation lens 3, that a ridge portion (namely, the intersection part between surfaces 2a and 2b) composed of vertexes of the isosceles triangle intersects with the optical axis of the image formation lens 3 in an upward or downward direction, and that a surface consisting of bases of the isosceles triangles (namely, a surface 2c) is orthogonal to the optical axis of the image formation lens 3.

Furthermore, a lens barrel 7 serving as an aperture limitation member supports the image formation lens 3. Moreover, a circular aperture 7a, whose center (axis) coincides with the optical axis of the image formation lens 3, is bored in a stage being subsequent to the image formation lens 3. Further, a flat-plate-like light shielding member 8 is provided uprightly on the image pickup device 6 in such a way as to extend along the optical axis of the image formation lens 3, as viewed in the figure, so that the imaging field in this image pickup device 6 is bisected into left-side and right-side portions.

Moreover, a diaphragm blade 9 serving as a diaphragm member has an aperture portion 9a and is attached between the image formation lens 3 and the aperture 7a of the lens barrel 7 in such a way as to be able to slide and move in a direction perpendicular to the optical axis. As shown in FIGS. 2A to 2C, an elongated cam groove 9b is bored in an end portion of this diaphragm blade 9 extending from this lens barrel 7, so that the longitudinal axis of the elongated cam groove extends in parallel with the direction in which the light shielding member 8 extends. Further, the aperture portion 9a of the diaphragm blade 9 is shaped like a rectangle which is larger than the aperture 7a of the lens barrel 7. Moreover, this aperture portion 9a is provided with triangular notches 9c for increasing the area of the aperture, which is provided in the central portion of each of pair of opposed sides thereof, between which the light shielding member 8 is interposed.

Furthermore, a motor 10 is placed in the outer casing 4 so that the shaft of rotation thereof is parallel with the optical axis. A crank 11 is securely fixed to the shaft of rotation of this motor 10. This crank 11 extends from an end of the shaft of rotation thereof in a direction being perpendicular to the direction in which the shaft of rotation thereof extends. Then, this crank 11 is bent in parallel with the shaft of rotation thereof. Further, a bent piece 11a thereof is inserted into a cam groove 9b.

In this camera, the optical element is composed of the prism 1 and the image formation lens 3. Further, a mirror image CCD is used as an image pickup device 6.

Next, an operation of this diaphragm blade will be described by referring to FIGS. 2A to 2C.

The crank 11 is driven by the motor 10, so that a bent piece 11a moves in a circular orbit. Further, the bent piece 11a of the crank 11 rotates by sliding in the cam groove 9b. Thus, the diaphragm blade 9 is slid and moved in a direction perpendicular to the optical axis, namely, in a direction perpendicular to the bisector of the imaging field of the image pickup device 6. This sliding movement of the diaphragm blade 9 results in change in overlap in the direction of the optical axis between the aperture 9a and the aperture 7a of the lens barrel 7.

In the case illustrated in FIG. 2A, the aperture 7a of the lens barrel 7 is opened in entirety. Thus, the area of the opened portion of the imaging field is equal to a total of imaging fields (namely, sub-fields) 6a and 6b obtained by bisecting the imaging field of the image pickup device 6 by using the light shielding member 8. Further, in the case illustrated in FIG. 2B, a portion of the aperture 7a, which is at the side of the imaging sub-field 6b, overlaps with the diaphragm blade 9, so that the ratio of the area of the opened portion to that of the imaging sub-field 6b decreases. Moreover, in the case illustrated in FIG. 2C, another portion of the aperture 7a, which is at the side of the imaging sub-field 6a, overlaps with the diaphragm blade 9, so that the ratio of the area of the opened portion to that of the imaging sub-field 6a decreases.

In this manner, the area of the opened portion of the aperture to the imaging sub-field 6a or 6b is changed. Thus, the quantities of incident light of the imaging sub-fields 6a and 6b are controlled independent of each other. Therefore, in the case when the luminance of the images respectively formed on the imaging sub-fields 6a and 6b are equal to each other, the diaphragm blade 9 is positioned so that the apertures 7a and 9a overlap with each other as illustrated in FIG. 2A. Further, in the case when the luminance of the image formed on the imaging sub-field 6b is too high as compared with the luminance of the image formed on the imaging sub-field 6a, the diaphragm blade 9 is placed so that the apertures 7a and 9a overlap with each other as illustrated in FIG. 2B. As a result, the quantity of light impinging upon the imaging sub-field 6b is decreased. Thus., the luminance of the images respectively formed on the imaging sub-fields 6a and 6b are uniformed. In contrast, in the case when the luminance of the image formed on the imaging sub-field 6a is too high as compared with the luminance of the image formed on the imaging sub-field 6b, the diaphragm blade 9 is placed so that the apertures 7a and 9a overlap with each other as illustrated in FIG. 2C. As a consequence, the quantity of light impinging upon the imaging sub-field 6a is reduced. Thus, the luminance of the images respectively formed on the imaging sub-fields 6a and 6b are uniformed.

Therefore, the ratio of the area of the notch 9c to the area of the opened portion of the imaging field increases with the decrease in the opened portion of the imaging field. Thus, in the case that the notch 9c is not provided, the rate of change of the area of the opened portion to the amount of the sliding movement of the diaphragm blade 9 changes monotonously when the area of the opened portion of the imaging field is small. Further, there is the fear of an occurrence of a hunting. However, if the notch 9c is provided, the rate of change of the area of the opened portion to the amount of the sliding movement of the diaphragm blade 9 changes gently when the area of the opened portion of the imaging field is small. Consequently, an occurrence of a hunting can be prevented.

Incidentally, the drive means is composed of the motor 10, the crank 11 and the cam groove 9b.

Next, a method of controlling the quantities of incident light corresponding to the imaging sub-fields 6a and 6b will be described hereinbelow by referring to FIG. 3.

First, detection signals detected in the imaging sub-fields 6a and 6b of the image pickup device 6 are inputted to a computing portion 21 serving as a computing unit. Then, a subtraction between data represented by the detection signals is performed in the computing portion 21. On the other hand, a control portion 22 serving as a control unit controls the operation of driving the motor 10 in such a manner that data represented by an output signal of the computing portion 21 is 0. For example, in the case that the quantity of light impinging on the imaging sub-field 6b is larger than that of light impinging on the imaging sub-field 6a, the control portion 22 drives and causes the motor 10 to rotate, and further causes the sliding movement of the diaphragm blade 9 so that the area of the opened portion at the side of the imaging sub-field 6b decreases. Further, the control portion 22 stops the rotation of the motor 10 when data represented by an output signal of the computing portion 21 becomes 0. Thus, the quantity of light impinging on the imaging sub-field 6a becomes equal to that of light impinging on the imaging sub-field 6b. Consequently, the luminances of the left-hand part and the right-hand part of the screen of a monitor television 40 are uniformed.

An operation of a camera 100 constructed as above described will be described hereinafter.

Extraneous light (ray) 5a coming from the right (namely, from the right, as viewed in FIG. 1) is incident on the outer casing 4 through the entrance window 4a and reaches the prism 1. Extraneous light 5a is then transmitted by the surface 2a and is incident on the prism 1. Subsequently, the extraneous light 5a undergoes an internal reflection on the surface (portion) 2b. Then, the extraneous light 5a is transmitted by the surface 2c, and exits from the prism 1. Extraneous light 5a having exited from the prism 1 is next. incident on the image formation lens 3, so that an inverted mirror image is formed on the right-hand imaging sub-field 6a of the imaging field, which is bisected by the light shielding member 8, of the image pickup device 6.

On the other hand, the extraneous light 5b coming from the left (namely, from the left, as viewed in FIG. 1) is incident on the outer casing 4 through the entrance window 4b and then reaches the prism 1. Subsequently, the extraneous light 5b is transmitted by the surface 2b and is incident on the prism 1. Subsequently, the extraneous Light 5b undergoes an internal reflection on the surface 2a. The extraneous light 5b reflected by this surface 2a is transmitted by the second surface 2c and then exits from the prism. Then, the extraneous light 5b having exited from the prism 1 is incident on the image formation lens 3, so that an inverted mirror image is formed on the left-hand imaging sub-field 6b of the imaging field, which is bisected by the light shielding member 8, of the image pickup device 6.

At that time, output signals outputted from the imaging sub-fields 6a and 6b of the image pickup device 6 are inputted to the computing portion 21, the balance between the quantities of incident light of the imaging sub-fields 6a and 6b is monitored by the control portion 22. Further, when the balance between the quantities of incident light of the imaging sub-fields 6a and 6b is lost, the control portion 22 controls the operation of driving the motor 10 so that data represented by an output signal of the computing portion 21 becomes 0. Consequently, the quantities of incident light of the imaging sub-fields 6a and 6b are uniformed.

Thus, when this camera 100 is applied to an apparatus for visual recognition of surroundings of a vehicle, this camera 100 is mounted on the front bumper of the vehicle in such a manner that the optical axis of the image formation lens 3 extends horizontally, and that the ridge portion, in which a ridge portion serving as the intersection portion between the surfaces 2a and 2b of the prism 1, faces a place in front of the vehicle. Moreover, the camera 100 is connected to a monitor television 40 so that an output of the image pickup device 6 is inputted to the monitor television 40 acting as display means.

Further, an inverted mirror image obtained from the extraneous light 5a coming from the right-hand side of the vehicle is formed on the right-hand imaging (sub-) field 6a of the imaging plane of the image pickup device 6. Furthermore, an inverted mirror image obtained from the extraneous light 5b coming from the left-hand side of the vehicle is formed on the left-hand imaging field 6b of the imaging plane of the image pickup device 6. Picture signal representing the inverted mirror image obtained from the light received by this image pickup device 6 is converted into an image signal representing an inverted normal image obtained by flipping the inverted mirror image from side to side. Image signal obtained in this manner is outputted from the image pickup device 6 and is further displayed on the screen of the monitor television 40 so that the inverted normal image is changed upside down. Thus, an erected normal image formed from the extraneous light 5a coming from the right is displayed on the right-hand half 40a of the screen of the monitor television 40. Furthermore, another erected normal image formed from the extraneous light 5b coming from the left is displayed on the left-hand half 40b of the screen of the monitor television 40.

Further, detection signals detected in the imaging sub-fields 6a and 6b of the image pickup device 6 are inputted to the computing portion 21. Then, a subtraction between data represented by the detection signals is performed in the computing portion 21. The control portion 22 controls the operation of driving the motor 10 so that data represented by an output signal of the computing portion 21 is 0. Consequently, even if the luminance of the left-side imaging field is different from that of the right-side imaging field, the luminance of the left-hand half or part and the right-hand part of the screen of a monitor television 40 are uniformed.

Thus, a driver can check the conditions of the left-side and right-side blind spots from the screen of the monitor television 40.

As above stated, in the case of this first embodiment, the prism 1 formed in the shape of a square pillar, whose section is shaped like an isosceles triangle, is provided in a stage preceding the imaging lens 3. Further, an inverted mirror image obtained from the extraneous light 5a having been incident from the surface 2a is formed on a field or area on the side of the surface 2a of the image pickup device 6, while an inverted mirror image obtained from the extraneous light 5b having been incident from the surface 2b is formed on a field on the side of the surface 2b of the image pickup device 6. Thus, the reflection of the extraneous light is performed only once. The configuration of the camera (and thus that of the apparatus for visual recognition of surroundings of a vehicle) can be simplified. Consequently, a small inexpensive camera is obtained.

Moreover, the light shielding member 8 is provided uprightly on the imaging plane of the image pickup device 6 in such a way as to extend along the optical axis of the image formation lens 3, as viewed in the figure, so that the imaging field in this image pickup device 6 is bisected into the imaging fields 6a and 6b. Furthermore, a diaphragm blade 9 having an aperture 9a is attached between the image formation lens 3 and the aperture 7a of the lens barrel 7 in such a way as to be able to slide and move in a direction perpendicular to the optical axis. By moving this diaphragm blade 9, this aperture 9a comes to overlap with the aperture 7a of the lens barrel 7 in the direction of the optical axis. Further, the areas of the aperture 7a, which respectively correspond to the imaging fields 6a and 6b, can be changed independent of each other. Thus, even if the luminance brightness of the entrance window 4a is different from that of the entrance window 4b, the quantities of incident light 5a and 5b of the imaging (sub-)fields 6a and 6b can be regulated in such a manner as to be equal to each other. Consequently, the luminance of two images corresponding to different directions can be uniformed.

Further, because of the facts that the computing portion 21 calculates the difference between data respectively represented by output signals sent from the image fields 6a and 6b and that the control portion 22 controls the operation of driving the motor 10 in such a manner that the difference between the aforesaid output signals is zero, the luminance of the entire picture consisting of two images obtained from the extraneous light rays 5a and 5b can be uniform at all times.

Moreover, by mounting this camera 100 on a vehicle, an erected normal image obtained from the extraneous light coming from the right is displayed on the right-hand part of the screen of the monitor television 40. Moreover, a normal image obtained from the extraneous light coming from the left is displayed on the left-hand part of the screen thereof. Thus, the direction, in which an image is displayed on the screen of the monitor television 40, is in agreement with the direction of incidence of the light representing the image. Consequently, the images displayed on the screen of the monitor television is easy for the driver to observe.

Furthermore, even when the luminances of the left-hand and right-hand imaging fields or areas are different from each other, the areas of the apertures respectively corresponding to the imaging fields 6a and 6b are regulated, so that the quantities of incident light of the imaging fields 6a and 6b are uniformed. Thus, the luminance of the left-hand half of the monitor television 40 becomes equal to that of the right-half thereof. Consequently, there is obtained an apparatus for visual recognition of surroundings of a vehicle, which provides an image that is easy for the driver to observe.

Embodiment 2

In the case of this second embodiment, at least one of an electronic iris and an automatic gain control (AGC) circuit is mounted on the camera 100 of the aforementioned first embodiment.

Thus, in the case of this second embodiment, the quantities of extraneous light rays 5a and 5b coming from the right and left, respectively, can be equalized, similarly as in the case of the aforementioned first embodiment. Consequently, the luminances of images formed on the imaging fields 6a and 6b, respectively, are uniformed.

Furthermore, the luminance of a picture consisting of two images respectively formed on the imaging fields 6a and 6b can be controlled collectively by the electronic iris and AGC circuit.

Thus, in the case of this second embodiment, the luminances of the two images formed on the imaging fields 6a and 6b, respectively, are uniformed (or equalized). In addition, the luminance of the entire picture composed of these two images is controlled, so that an image, which is further easier to observe, is obtained.

Embodiment 3

Figure 4:
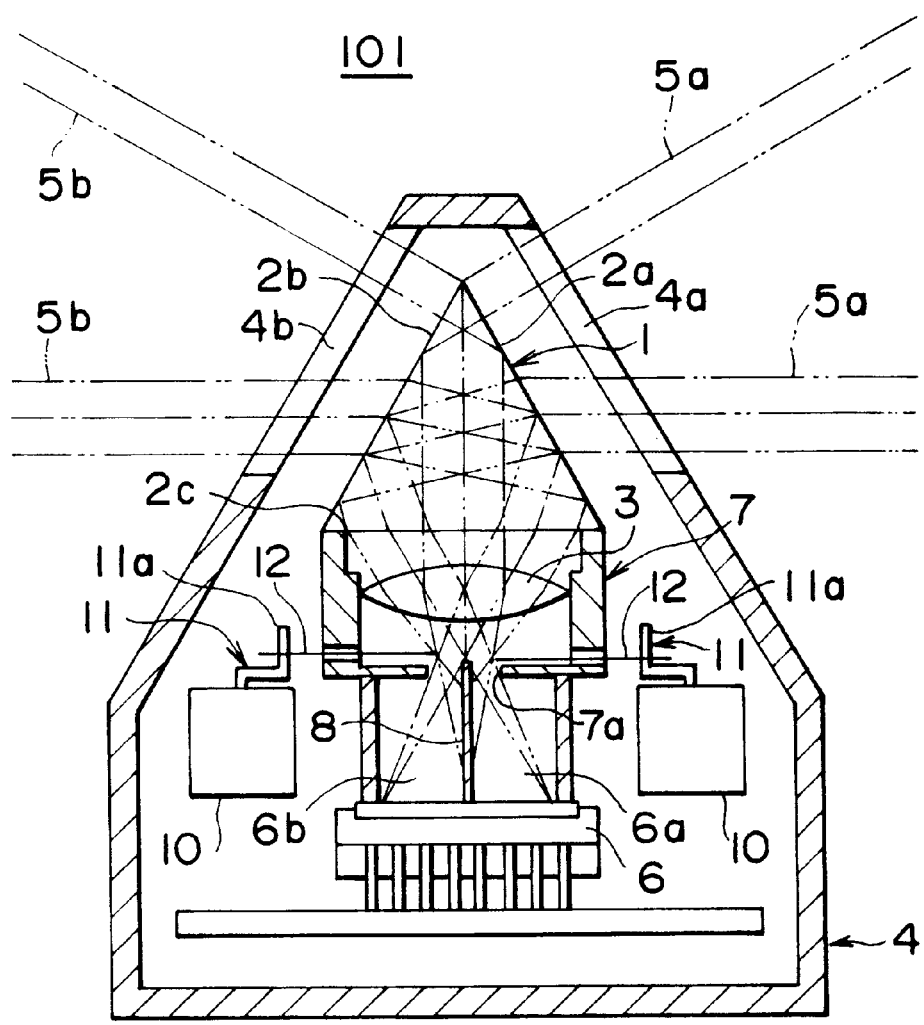
FIG. 4 is a sectional view of a camera in accordance with a third embodiment of the present invention.
Figure 5A:
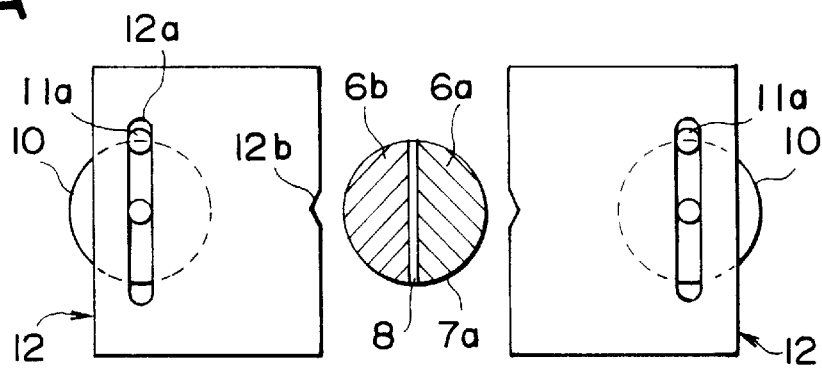
FIGS. 5A to 5D are diagrams for illustrating operations of diaphragm blades in this camera in accordance with the third embodiment of the present invention.
Figure 5B:
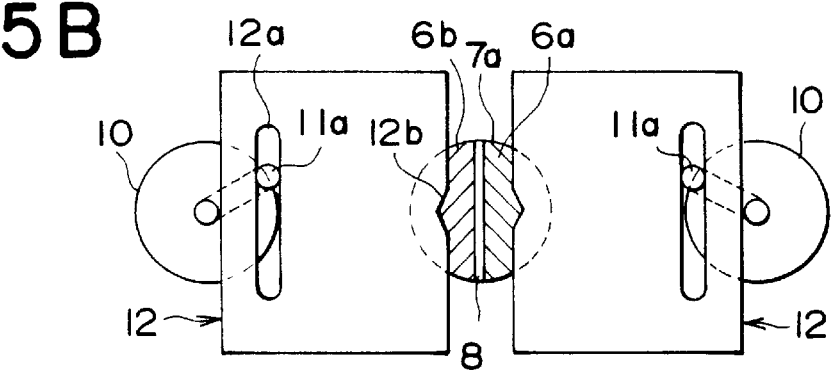
Figure 5C:
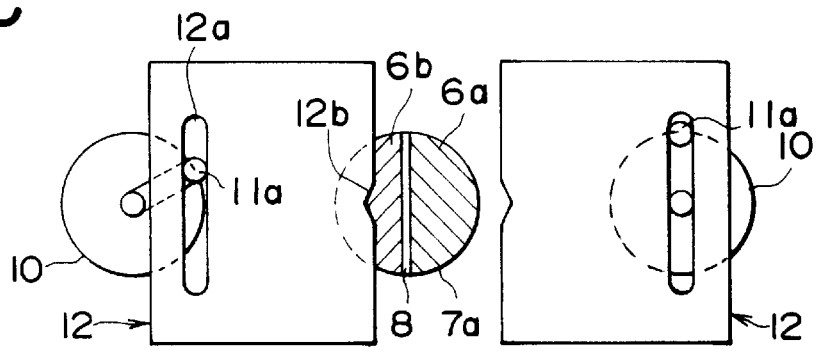

FIG. 4 is a sectional view of a camera in accordance with a third embodiment of the present invention. FIGS. 5A to 5D are diagrams for illustrating an operation of a diaphragm blade in this camera in accordance with the third embodiment of the present invention. FIG. 5A illustrates the case that the quantity of incident light of a left-side imaging field is equal to that of incident light of a right-side imaging field; FIG. 5B the case that the quantity of incident light of a left-side imaging field is equal to that of incident light of a right-side imaging field and that the quantities of incident light is too large; FIG. 5C the case that the quantity of incident light of the left-side imaging field is large (in comparison with that of incident light of the right-side imaging field); and FIG. 5D the case that the quantity of incident light of the right-side imaging field is large (in comparison with that of incident light of the left-side imaging field).

In the case of a camera 101 of this third embodiment, two diaphragm blades 12 serving as diaphragm means are mounted to the lens barrel 7 in such a way as to face each other across the light shielding member 8 and to be able to slide and move in a direction perpendicular to the optical axis between the image formation lens 3 and the aperture 7a of the lens barrel 7. As shown in FIGS. 5A to 5D, an elongated cam groove 12a is bored in an end portion of the lens barrel 7 extending from this diaphragm blade 12, so that the longitudinal axis of the elongated cam groove extends in parallel with the direction in which the light shielding member 8 extends. Further, each of the aperture portions 12 is provided with triangular notches 12c for increasing the area of the aperture, which are provided in the central portion of each of pair of opposed sides thereof.

Furthermore, two motors 10 are placed in the outer casing 4 in such a way as to face each other across the light shielding member 8. Further, each of the motors 10 are constructed so that the shaft of rotation thereof is parallel with the optical axis. Moreover, a crank 11 is securely fixed to the shaft of rotation of each of the motors 10. Each of the cranks 11 extends from an end of the shaft of rotation thereof in a direction being perpendicular to the direction in which the shaft of rotation thereof extends. Then, this crank 11 is bent in parallel with the shaft of rotation thereof. Further, a bent piece 11*a* thereof is inserted into a cam groove 12*a*.

Incidentally, the remaining (composing) elements of this embodiment are similar to the corresponding ones of the aforementioned first embodiment of the present invention.

In the case of this embodiment, the drive means is composed of the motors 10, the cranks 11 and the cam grooves 12*a*. Further, two motors 10 are controlled by the control portion 22 independent of each other so that data represented by output signals of the computing portion 21 are 0.

Next, an operation of the diaphragm blades of this camera 101 will be described by referring to FIGS. 5A to 5D.

The cranks 11 are driven by the motors 10, respectively, so that bent pieces 11*a* move in circular orbits. Further, the bent pieces 11*a* of the cranks 11 rotate by sliding in the cam grooves 12*b*. Thus, the diaphragm blades 12 are slid and moved in direction perpendiculars to the optical axis, namely, in directions perpendicular to the bisector of the imaging field of the image pickup device 6. This sliding movement of each of the diaphragm blades 12 results in change in overlap in the direction of the optical axis between the blade 12 and the aperture 7*a* of the corresponding lens barrel 7.

In the case illustrated in FIG. 5A, the diaphragm blades 12 do not overlap with the aperture 7*a* of the lens barrel 7, respectively. Further, the aperture 7*a* of the lens barrel 7 is opened in entirety. Thus, the area of the opened portion of the imaging field is equal to a total of imaging fields (namely, sub-fields) 6*a* and 6*b* obtained by bisecting the imaging field of the image pickup device 6 by using the light, shielding member 8.

Further, in the case illustrated in FIG. 5B, the diaphragm blades 12 uniformly (or equally) overlap with the aperture 7*a* at the both sides of the light shielding member 8, respectively. Furthermore, the areas of the opened portions of the apertures respectively corresponding to the imaging sub-fields 6*a* and 6*b* are equal to each other.

Moreover, in the case illustrated in FIG. 5C, a portion of the aperture 7*a*, which is at the side of the imaging sub-field 6*b*, overlaps with the corresponding diaphragm blade 12, so that the ratio of the area of the opened portion to that of the imaging sub-field 6*b* decreases. Furthermore, in the case illustrated in FIG. 5D, a portion of the aperture 7*a*, which is at the side of the imaging sub-field 6*a*, overlaps with the corresponding diaphragm blade 12, so that the ratio of the area of the opened portion to that of the imaging sub-field 6*a* decreases.

In this manner, the area of the opened portion of the aperture to the imaging sub-field 6*a* or 6*b* is changed. Thus, the quantities of incident light of the imaging sub-fields 6*a* and 6*b* are controlled independent of each other. Therefore, in the case when the luminance of the images respectively formed on the imaging sub-fields 6*a* and 6*b* are equal to each other, the diaphragm blades 12 are positioned so that the aperture 7*a* overlaps with each of the blades 12 as illustrated in FIG. 5A. Further, in the case that the luminances of the images formed on the imaging sub-fields 6*a* and 6*b* are too high, the diaphragm blades 12 are placed so that the aperture 7*a* overlaps with each of the blades 12 as illustrated in FIG. 5B.

Further, in the case that the luminance of the image formed on the imaging sub-field 6*b* is too high as compared with the luminance of the image formed on the imaging sub-field 6*a*, the diaphragm blades 12 are placed so that the aperture 7*a* overlaps with each of the blades 12 as illustrated in FIG. 5C. As a result, the quantity of light impinging upon the imaging sub-field 6*b* is reduced. Thus, the luminances of the images respectively formed on the imaging sub-fields 6*a* and 6*b* are uniformed.

Figure 5D:
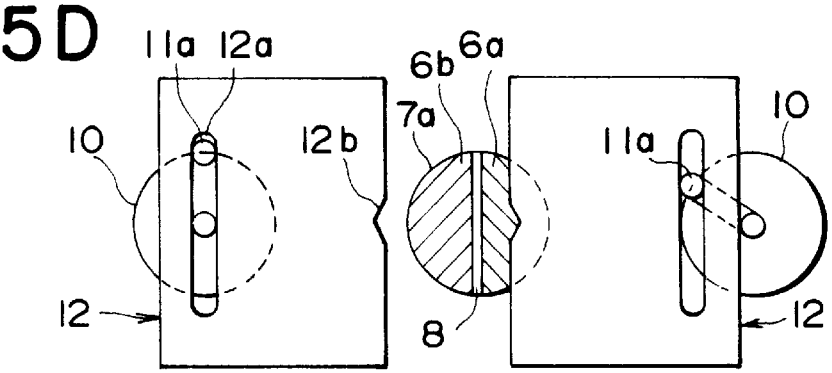

Moreover, in the case that the luminance of the image formed on the imaging sub-field 6*a* is too high as compared with the luminance of the image formed on the imaging sub-field 6*b*, the diaphragm blades 12 are placed so that the aperture 7*a* overlaps; with each of the blades 12 as illustrated in FIG. 5D. As a result, the quantity of light impinging upon the imaging sub-field 6*b* is reduced. Thus, the luminances of the images respectively formed on the imaging sub-fields 6*a* and 6*b* are uniformed.

Therefore, the ratio of the area of the notch 12*b* to the area of the opened portion of the imaging field increases with the decrease in the opened portion of the imaging field. Thus, in the case that the notch 12*b* is not provided, the rate of change of the area of the opened portion to the amount of the sliding movement of the diaphragm blade 12 changes monotonously when the area of the opened portion of the imaging field is small. Further, there is the fear of an occurrence of a hunting. However, if the notch 12*b* is provided, the rate of change of the area of the opened portion to the amount of the sliding movement of the diaphragm blade 12 changes gently when the area of the opened portion of the imaging field is small. Consequently, an occurrence of a hunting can be prevented.

Therefore, in the case of this third embodiment, even when the luminances respectively corresponding to the entrance windows 4*a* and 4*b* are different from each other, the quantities of extraneous light rays 5*a* and 5*b* respectively impinging upon the imaging sub-fields 6*a* and 6*b* can be regulated in such a manner as to be equal to each other, similarly as in the case of the aforementioned first embodiment. Thus, the luminances of the two images respectively corresponding to different directions can be uniformed.

Furthermore, the two diaphragm blades 12 are slid and moved by the motors 10, respectively, independent of each other. Thus, the areas of the apertures respectively corresponding to the imaging fields 6*a* and 6*b* can be controlled independent of each other. Consequently, the quantity of light corresponding to the entire picture composed of the two images can be controlled, with the result that an image, which is easy to observe, can be obtained.

Embodiment 4

Figure 6:
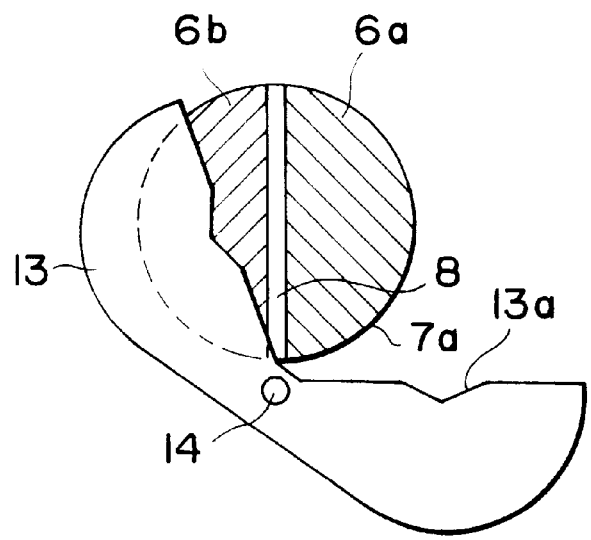
FIG. 6 is a diagram illustrating the configuration of composing elements in the neighborhood of a diaphragm blade of a camera in accordance with a fourth embodiment of the present invention.

FIG. 6 is a diagram illustrating the configuration of composing elements in the neighborhood of a diaphragm blade of a camera in accordance with a fourth embodiment of the present invention.

As shown in this figure!, the diaphragm blade 13 is constituted by a flat plate an: is disposed between the image formation lens 3 and the aperture 7*a* of the lens barrel 7 so that the principal plane is orthogonal to the optical axis. Further, the diaphragm blade 13 is attached in this camera in such a way that the shaft center portion thereof provided along the direction, in which a light shielding member 8 extends, and outside the aperture 7*a* can rock (or swing) about the shaft 14 of rotation that is parallel with the optical axis. Moreover, this diaphragm blade 13 is provided with a notch 13*a*. This shaft 14 of rotation is rotated and driven by a motor (not shown) serving as the drive means.

Incidentally, the rest of the composing elements of this embodiment are similar to the corresponding elements of the aforementioned first embodiment.

In the case of this fourth embodiment, by driving the motor, the diaphragm blade 13 swings about the shaft 14 of rotation thereof. As a result of this swinging motion of the diaphragm blade 13, the blade 13 overlaps with the aperture 7a in the direction of the optical axis, so that the areas of the apertures corresponding to the imaging fields 6a and 6b, respectively, are changed independent of each other.

Further, if the operation of driving the motor is controlled by using a control system illustrated in FIG. 3, the quantities of light impinging upon the imaging fields 6a and 6b can be equalized. Consequently, the luminances of the left-side part and the right-hand part of the screen of the monitor television 40 can be uniformed.

Incidentally, the notch 13a acts similarly as the notch 9c of the diaphragm blade 9 of the aforementioned first embodiment does.

Therefore, this fourth embodiment can obtain advantageous effects similar to those of the aforementioned first embodiment.

Embodiment 5

Figure 7:
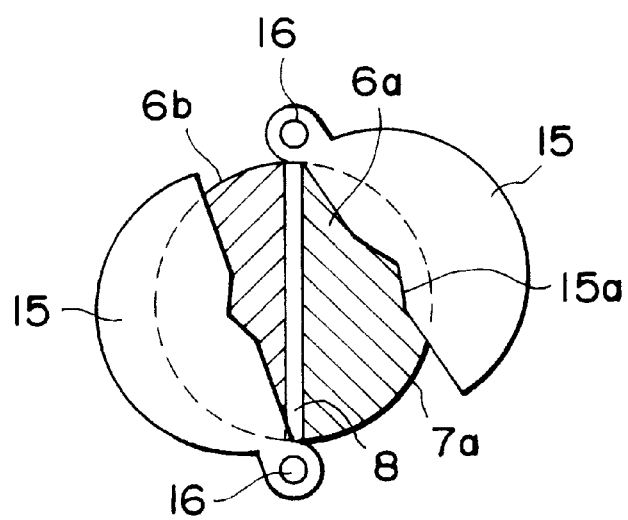
FIG. 7 is a diagram illustrating the configuration of composing elements in the neighborhood of a diaphragm blade of a camera in accordance with a fifth embodiment of the present invention.

FIG. 7 is a diagram illustrating the configuration of composing element s in the neighborhood of a diaphragm blade of a camera in accordance with a fifth embodiment of the present invention.

As shown in this figure, each of two diaphragm blades 15 is constituted by a flat plate and is disposed between the image formation lens 3 and the aperture 7a of the lens barrel 7 so that the principal plane is orthogonal to the optical axis. Further, the diaphragm blades 15 are attached in this camera in such a way that the shaft center portions thereof provided along the direction, in which a light shielding member 8 extends, and outside the aperture 7a face each other and can rock (or swing) about a pair of shafts 16 of rotation, which are parallel with the optical axis, respectively. Moreover, each of these diaphragm blades 15 is provided with a notch 15a. This pair of shafts 16 of rotation are rotated and driven independent of each other by a motor (not shown) serving as the drive means.

Incidentally, the rest of the composing elements of this embodiment are similar to the corresponding elements of the aforementioned third embodiment.

In the case of this fifth embodiment, by driving the motor, each of the diaphragm blades 15 swings about the corresponding shaft 16 of rotation thereof. As a result of this swinging motion of the diaphragm blade 15, the blade 15 overlaps with the aperture 7a in the direction of the optical axis, so that the areas of the apertures corresponding to the imaging fields 6a and 6b, respectively, are changed independent of each other.

Further, if the operation of driving the motor is controlled by using the control system illustrated in FIG. 3, the quantities of light impinging upon the imaging fields 6a and 6b can be equalized. Consequently, the luminances of the left-side part and the right-hand part of the screen of the monitor television 40 can be uniformed.

Moreover, the areas of the apertures respectively corresponding to the imaging fields 6a and 6b are controlled independent of each other. Thereby, the quantity of incident light corresponding to the entire picture composed of the two images can be controlled.

Incidentally, the notch 15a acts similarly as the notch 9b of the diaphragm blade 12 of the aforementioned third embodiment does.

Therefore, this fifth embodiment can obtain advantageous effects similar to those of the aforementioned third embodiment.

Embodiment 6

Figure 8:
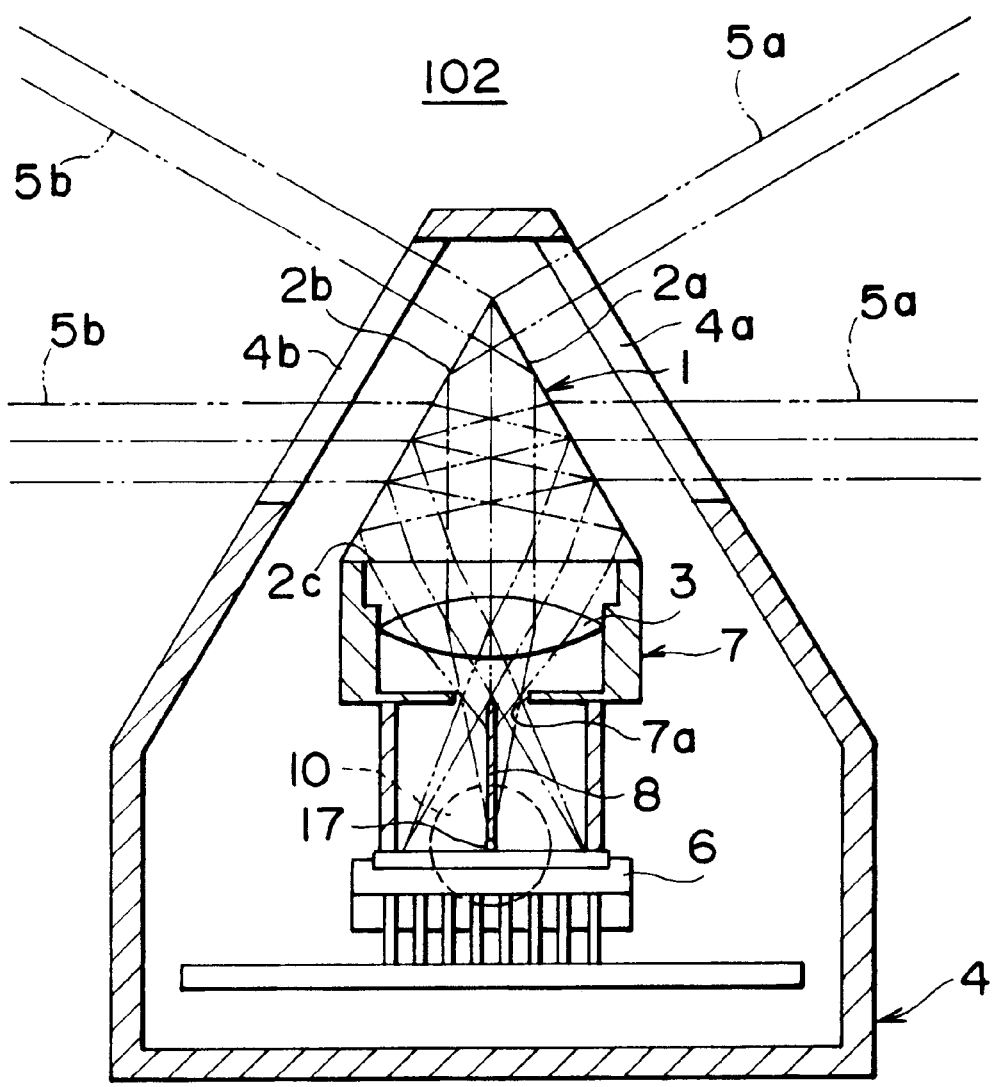
FIG. 8 is a sectional view of yet another camera in accordance with a sixth embodiment of the present invention.
Figure 9A:
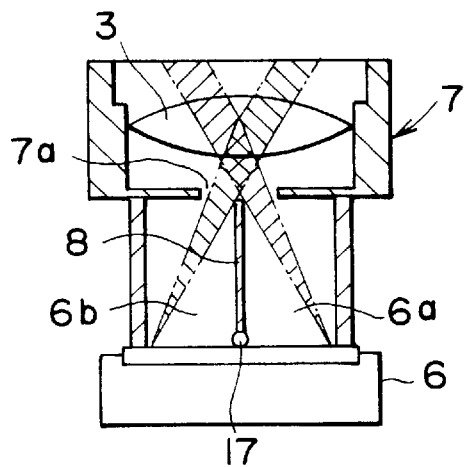
FIGS. 9A to 9C are diagrams for illustrating an operation of regulating (or controlling) the quantity of incident light of this camera in accordance with the sixth embodiment of the present invention.
Figure 9B:
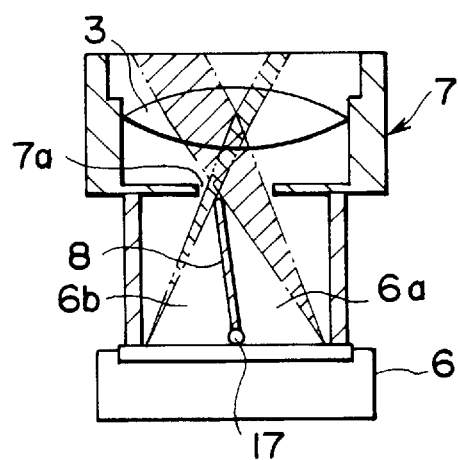
Figure 9C:
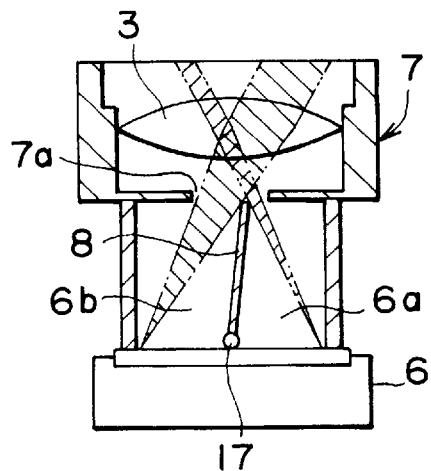
Figure 10:
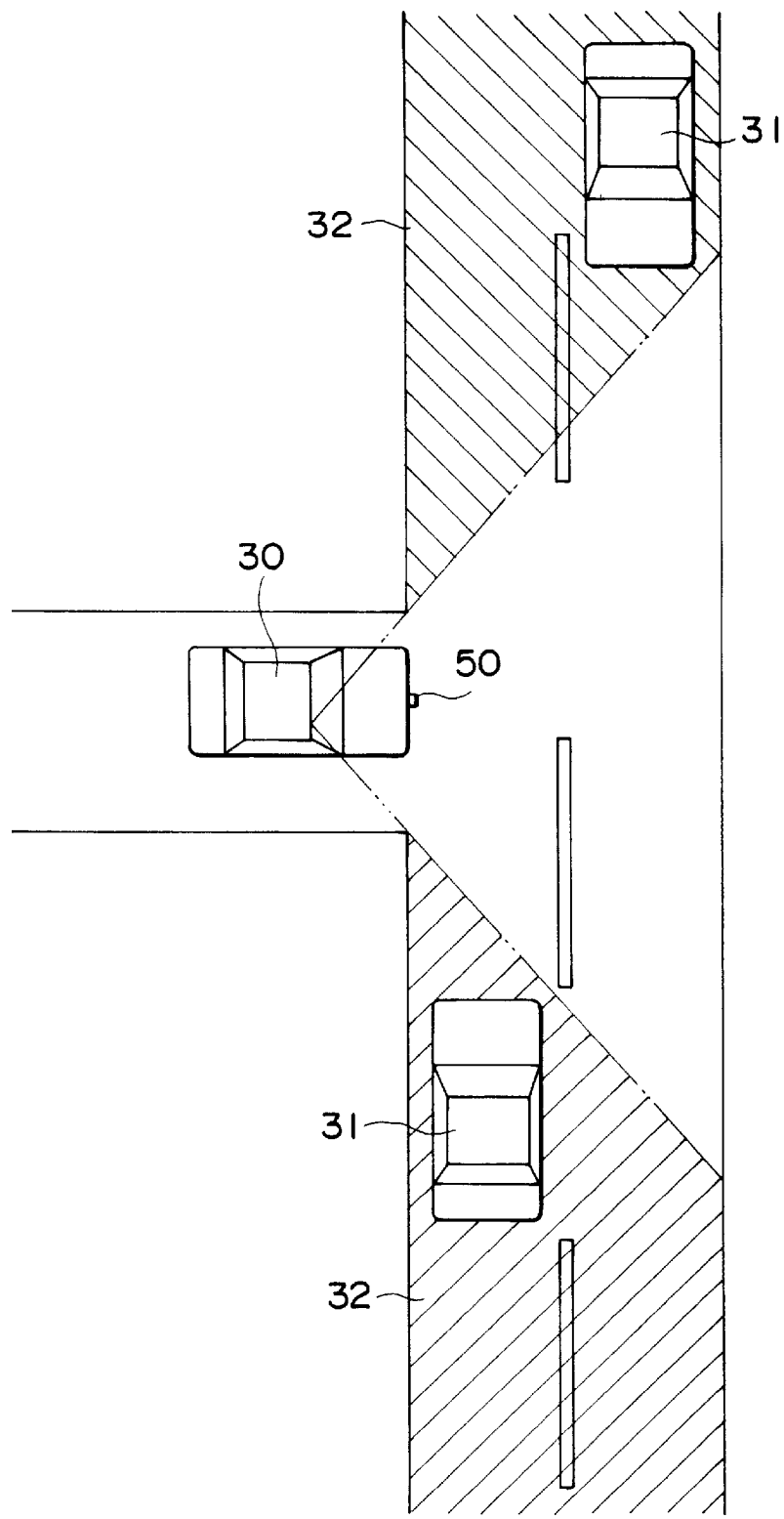
FIG. 10 is a diagram for illustrating the operation of a vehicle equipped with the conventional apparatus for visual recognition of surroundings of the vehicle.
Figure 11:
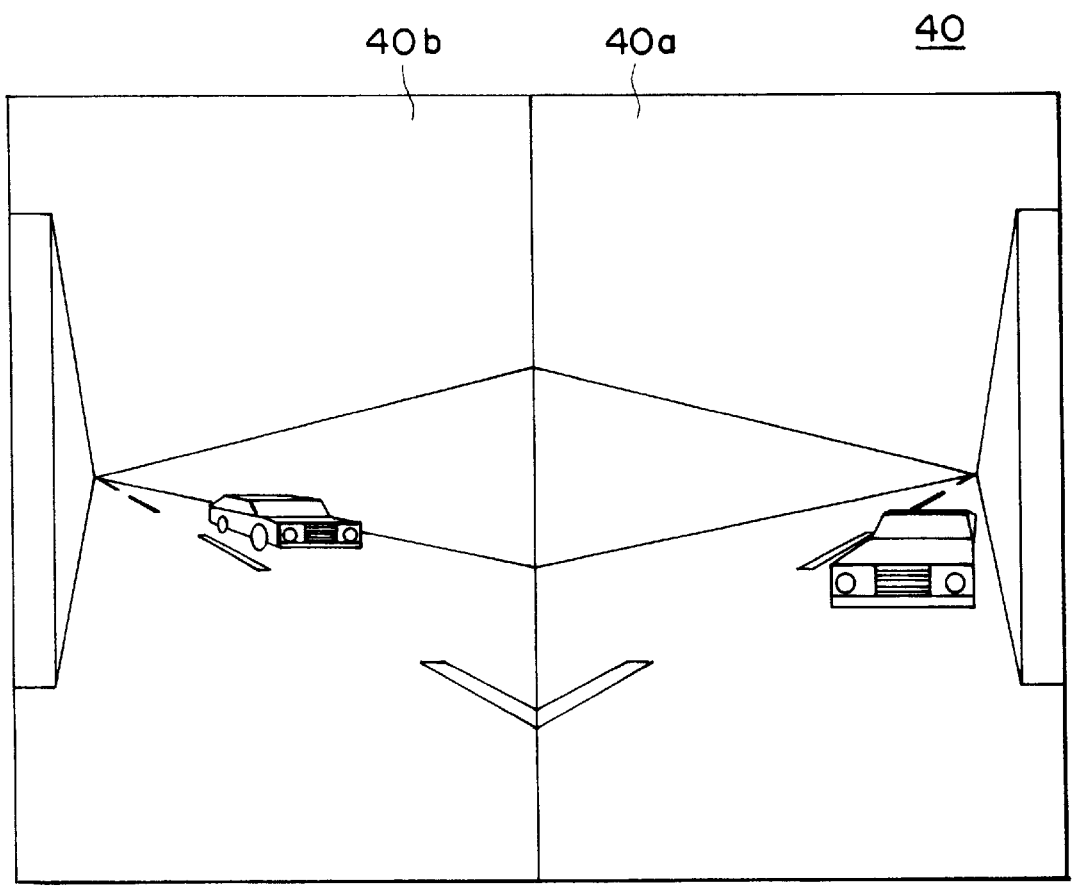
FIG. 11 is a front view of a display presented on the screen of a monitor television in the conventional apparatus for visual recognition of surroundings of a vehicle.

FIG. 8 is a sectional view of a camera in accordance with a sixth embodiment of the present invention. FIGS. 9A to 9C are diagrams for illustrating an operation of a diaphragm blade in this camera in accordance with the sixth embodiment of the present invention. FIG. 9A illustrates the case that the quantity of incident light of a left-side imaging field is equal to that of incident light of a right-side imaging field; FIG. 9B the case that the quantity of incident light of the left-side imaging field is larger than that of incident light of the right-side imaging field; and FIG. 9C the case that the quantity of incident light of the right-side imaging field is larger than that of incident light of the left-side imaging field.

In the case of a camera 102, a flat-plate-like light shielding member 8 is provided uprightly on the image pickup device 6 in such a way as to extend along the optical axis of the image formation lens 3, as viewed in the figure, so that the imaging field in this image pickup device 6 is bisected into left-side and right-side portions. Moreover, an end portion of this light shielding member 8, which is at the side of this image pickup device 6, is securely fixed to the shaft of rotation 17, the shaft center of which is orthogonal to the optical axis. Furthermore, a motor 10 serving as the drive means is operative to rotate and drive a shaft 17 of rotation.

Incidentally, the rest of the composing elements of this sixth embodiment are similar to those of the aforementioned first embodiment.

Next, an operation of controlling the quantity of incident light in this camera 102 will be described by referring to FIGS. 9A to 9C.

First, the shaft 17 of rotation is rotated and driven by the motor 10. Thereby, the light shielding member 8 is rocked about the shaft 17 of rotation. Further, by this rocking motion of the light shielding member 8, the overlap in the direction of the optical axis between the light shielding member 8 and the aperture 7a of the lens barrel 7 are changed.

In the case illustrated in FIG. 9A, the principal plane of the light shielding member 8 coincides with the optical axis. Further, the areas of the apertures respectively corresponding to the imaging fields 6a and 6b of the image pickup device a re equal to each other.

Further, in the case illustrated in FIG. 9B, the light shielding member 8 inclines toward the imaging field 6b about the shaft 17 of rotation, so that the quantity of extraneous light 5b impinging upon the imaging field 6b through the aperture 7a is decreased. Moreover, in the case illustrated in FIG. 9C, the light shielding member 8 inclines toward the imaging field 6a about the shaft 17 of rotation, so that the quantity of extraneous light 5a impinging upon the imaging field 6a through the aperture 7a is decreased.

In this manner, the quantities of incident light of the imaging fields 6a and 6b are controlled independent of each other. Thus, in the case that the luminances of images respectively formed on the imaging fields 6a and 6b are equal to each other, the light shielding member 8 is positioned as illustrated in FIG. 9A.

Furthermore, in the case that the luminance of an image formed on the imaging field 6b is too high in comparison with that of an image formed on the imaging field 6a, the light shielding member 8 is placed as illustrated in FIG. 9B. As a result, the quantity of light impinging upon the imaging field 6b is reduced. Consequently, the luminances of images formed on the imaging fields 6a and 6b are uniformed.

In contrast, in the case that the luminance of an image formed on the imaging field 6a is too high in comparison with that of an image formed on the imaging field 6b, the light shielding member 8 is placed as illustrated in FIG. 9C. As a result, the quantity of light impinging upon the imaging field 6a is reduced. Consequently, the luminances of images formed on the imaging fields 6a and 6b are uniformed.

If the operation of driving the motor 10 is controlled by using the control system shown in FIG. 3, the quantities of incident light to the imaging fields 6a and 6b can be equalized. Consequently, the luminances of the left-hand part and the right-hand part of the screen of the monitor television 40 can be uniformed.

Therefore, this sixth embodiment obtains advantageous effects similar to those of the aforementioned first embodiment.

Incidentally, in the case of each of the aforementioned embodiments, an optical element for forming images on the imaging plane of the image pickup device 6 from the extraneous light rays 5a and 5b taken in through the entrance windows 4a and 4b is composed of the prism 1 and the imaging lens 3. However, similar advantageous effects are obtained by using the first mirrors 18a and 18b and the second mirrors 19a and 19b shown in FIG. 12 instead of the prism 1.

Additionally, in the case of each of the embodiments, the difference between data represented by output signals of the imaging fields (namely, sub-fields) 6a and 6b is computed by the computing portion 21. Further, the operation of driving the motor is controlled by the control portion 22 so that the difference between the data represented by these output signals is 0. The control portion 22, however, does not necessarily control the motor so that the difference therebetween is 0. Namely, the control portion 22 has only to control the motor so that the difference between the luminance of the left-side part 40a and that of the right-hand part 40b of the screen of the television monitor 40 is visually allowable.

The cameras and apparatuses of the present invention are configured as above described and thus have the following advantageous effects.

Namely, in the case of a camera according to the present invention, this camera comprises: a housing having a plurality of entrance windows through each of which extraneous light rays are taken in; an image pickup device mounted in this housing; an optical element for forming images obtained from the extraneous light rays taken in through the plurality of entrance windows on an imaging plane of the image pickup device; a light shielding member that is provided in such a way as to be upright on the imaging plane of the image pickup device and to divide the imaging plane of the image pickup device into imaging fields on which images are respectively formed from the extraneous light rays taken in through the plurality of entrance windows; an aperture limitation member which is placed in a stage preceding this light shielding member and has an aperture for limiting a size of an incidence optical path of each of the extraneous light rays from which images are formed on the imaging plane of the image pickup device; a diaphragm member that is disposed in the stage preceding the light shielding member in such a manner as to be able to move in a direction perpendicular to an optical axis, for regulating the quantities of incident light of the imaging fields by overlapping with the aperture in the direction of the optical axis; and drive means for moving this diaphragm member in a direction perpendicular to the optical axis. Thus, there is obtained a camera adapted to uniform the luminances of images, which are respectively formed from extraneous light rays taken in from the plurality of entrance windows, so that images, which are easy to observe, are obtained.

Further, in the case of an embodiment of this camera of the present invention, the light shielding member is constituted by a single piece of a light shielding plate formed in the shape of a principal plane adapted to overlap with the aperture in the direction of the optical axis by moving in the direction perpendicular to the optical axis so that an area of the incidence optical path of the extraneous light rays respectively impinging upon the imaging sub-fields can be changed. Thus, the composing part can be simplified. Consequently, the reduction in size of the camera is achieved.

Alternatively, in the case of an embodiment of this camera of the present invention, the light shielding member is constituted by a plurality of light shielding plates, each of which is formed in the shape of a principal plane adapted to overlap with the aperture in the direction of the optical axis by moving in the direction perpendicular to the optical axis, to thereby change an area of the incidence optical path of the extraneous light rays respectively impinging upon the imaging sub-fields. Further, the drive means is configured in such a manner to move the plurality of light shielding plates independent of one another in a direction perpendicular to the optical axis. Thus, the luminance of the entire image, which includes images formed from extraneous light taken in from he plurality of entrance windows, can be controlled. Consequently, an image, which is further easier to observe, is obtained.

Moreover, in the case of another camera according to the present invention, this camera comprises: a housing having a plurality of entrance windows, through each of which extraneous light rays are taken in; an image pickup device mounted in this housing; an optical element for forming images obtained from the extraneous light rays taken in through the plurality of entrance windows on an imaging plane of the image pickup device; a light shielding member that is provided in such a way as to be upright on an imaging plane of the image pickup device and to divide the imaging plane of the image pickup device into imaging fields on which images are respectively formed from the extraneous light rays taken in through the plurality of entrance windows and that is constructed in such a manner as to be able to rock about an edge portion thereof which is at the side of the image plane; an aperture limitation member which is placed in a stage preceding this light shielding member and has an aperture for limiting the size of an incidence optical path of each of extraneous light rays from which images are formed on the imaging plane of the image pickup device; and drive means for rocking the light shielding member. Thus, there is obtained a camera adapted to uniform the luminances of images, which are respectively formed from extraneous light rays taken in from the plurality of entrance windows, so that images, which are easy to observe, are obtained.

Additionally, in the case of an embodiment of this camera of the present invention, this embodiment further comprises: a computing unit for computing a difference between data respectively represented by output signals outputted from the imaging sub-fields of the image pickup device; and a control unit for driving and controlling the drive means in such a manner that data computed by the computing unit is in a predetermined range. Thus, each of images formed from extraneous light taken in from the plurality of entrance windows can be controlled in such a manner as to have uniform luminance (brightness).

In addition, in the case of another embodiment of this camera of the present invention, this embodiment further comprises at least one of an electronic iris and an automatic gain control circuit. Consequently, the luminance of the entire image, which includes images formed from extraneous light taken in through the plurality of entrance windows, can be automatically controlled.

Furthermore, in the case of an apparatus for visual recognition of surroundings of a vehicle, this apparatus comprises: a housing mounted in a front portion of a vehicle and provided with a plurality of entrance windows through each of which extraneous light rays are taken in from the surroundings of the vehicle; an image pickup device mounted in the housing so that an imaging plane thereof faces a region located in front of the vehicle; an optical element that is disposed in the housing and is operative to form images obtained from extraneous light rays taken in through the plurality of entrance windows on the imaging plane of the image pickup device; a light shielding member that is provided in such a way as to be upright on an imaging plane of the image pickup device and to divide the imaging plane of the image pickup device into imaging fields on which images are respectively formed from the extraneous light rays taken in through the plurality of entrance windows; an aperture limitation member which is placed in a stage preceding this light shielding member and has an aperture for limiting the size of an incidence optical path of each of extraneous light rays from which images are formed on the imaging plane of the image pickup device; a diaphragm member that is disposed in the stage preceding the light shielding member in such a manner as to be able to move in a direction perpendicular to an optical axis, for regulating the quantities of incident light of the imaging sub-fields by overlapping with the aperture in the direction of the optical axis; drive means for moving this diaphragm member in a direction perpendicular to the optical axis; and display means for displaying an image signal representing images formed on the imaging plane of the image pickup device. Consequently, there is obtained an apparatus for visual recognition of surroundings of a vehicle, which is adapted to uniform the luminances of images, which are respectively formed from extraneous light rays taken in from the plurality of entrance windows, so that images, which are easy for a driver to observe, are obtained.

Moreover, in the case of another apparatus for visual recognition of surroundings of a vehicle according to the present invention, this apparatus for visual recognition of surroundings of a vehicle, comprises: a housing mounted in a front portion of a vehicle and provided with a plurality of entrance windows through each of which extraneous light rays are taken in from the surroundings of the vehicle; an image pickup device mounted in the housing so that an imaging plane thereof faces a region located in front of the vehicle; an optical element that is disposed in the housing and is operative to form images obtained from extraneous light rays taken in through the plurality of entrance windows on the imaging plane of the image pickup device; a light shielding member that is provided in such a way as to be upright on an imaging plane of the image pickup device and to divide the imaging plane of the image pickup device into imaging fields on which images are respectively formed from the extraneous light rays taken in through the plurality of entrance windows and that is constructed in such a manner as to be able to rock about an edge portion thereof which is at the side of imaging plane; an aperture limitation member which is placed in a stage preceding this light shielding member and has an aperture for limiting the size of an incidence optical path of each of extraneous light rays from which images are formed on the imaging plane of the image pickup device; drive means for rocking the light shielding member; and display means for displaying an image signal representing images formed on the imaging plane of the image pickup device. Thereby, there is obtained an apparatus for visual recognition of surroundings of a vehicle, which is adapted to uniform the luminances of images, which are respectively formed from extraneous light rays taken in from the plurality of entrance windows, so that images, which are easy for a driver to observe, are obtained.

Furthermore, in the case of an embodiment of this apparatus of the present invention, this embodiment further comprises: a computing unit for computing a difference between data respectively represented by output signals outputted from the imaging sub-fields of the image pickup device; and a control unit for driving and controlling the drive means in such a manner that data computed by the computing unit is in a predetermined range. Thus, each of images formed from extraneous light taken in from the plurality of entrance windows can be controlled in such a manner as to have uniform luminance (brightness).

Although the preferred embodiments of the present invention have been described above, it should be understood that the present invention is not limited thereto and that other modifications will be apparent to those skilled in the art without departing from the spirit of the invention.

The scope of the present invention, therefore, is to be determined solely by the appended claims.

What is claimed is:

1. A camera comprising:

a housing having a plurality of entrance windows through each of which extraneous light rays are taken in;

an image pickup device mounted in said housing;

an optical element for forming images obtained from said extraneous light rays taken in through said plurality of entrance windows on an imaging plane of said image pickup device;

a light shielding member that is provided in such a way as to be upright on said imaging plane of said image pickup device and to divide said imaging plane of said image pickup device into imaging fields on which images are respectively formed from said extraneous light rays taken in through the plurality of entrance windows;

an aperture limitation member which is placed in a stage preceding said light shielding member and has an aperture for limiting a size of an incidence optical path of each of extraneous light rays from which images are formed on the imaging plane of said image pickup device;

a diaphragm member that is disposed in the stage preceding said light shielding member in such a manner as to be able to move in a direction perpendicular to an optical axis, for regulating the quantities of incident light of said imaging fields by overlapping with said aperture in a direction of the optical axis; and drive means for moving said diaphragm member in a direction perpendicular to the optical axis.

2. The camera according to claim 1, wherein said light shielding member is constituted by a single piece of a light shielding plate formed in a shape of a principal plane adapted to overlap with said aperture in the direction of the optical axis by moving in the direction perpendicular to the optical axis, thereby changing an area of the incidence optical path of the extraneous light rays respectively impinging upon said imaging fields.

3. The camera according to claim 2, which further comprises at least one of an electronic iris and an automatic gain control circuit.

4. The camera according to claim 1, wherein said light shielding member is constituted by a plurality of light shielding plates each formed in a shape of a principal plane adapted to overlap with said aperture in the direction of the optical axis by moving in the direction perpendicular to the optical axis, to thereby change an area of the incidence optical path of the extraneous light rays respectively impinging upon said imaging fields, and wherein said drive means is configured in such a manner to move the plurality of light shielding plates independent of one another in a direction perpendicular to the optical axis.

5. The camera according to claim 1, which further comprises:
- a computing unit for computing a difference between data respectively represented by output signals outputted from said imaging fields of said image pickup device; and
- a control unit for driving and controlling said drive means in such a manner that data computed by said computing unit is in a predetermined range.

6. A camera comprising:
- a housing having a plurality of entrance windows, through each of which extraneous light rays are taken in;
- an image pickup device mounted in said housing;
- an optical element for forming images obtained from said extraneous light rays, taken in through said plurality of entrance windows on an imaging plane of said image pickup device;
- a light shielding member that is provided in such a way as to be upright on an imaging plane of said image pickup device and to divide said imaging plane of said image pickup device into imaging fields on which images are respectively formed from said extraneous light rays taken in through the plurality of entrance windows and that is constructed in such a manner as to be able to rock about an edge portion thereof which is at the side of said image plane;
- an aperture limitation member which is placed in a stage preceding said light shielding member and has an aperture for limiting a size of an incidence optical path of each of extraneous light rays from which images are formed on the imaging plane of said image pickup device; and
- drive means for rocking said light shielding member.

7. The camera according to claim 6, which further comprises:
- a computing unit for computing a difference between data respectively represented by output signals outputted from said imaging fields of said image pickup device; and
- a control unit for driving and controlling said drive means in such a manner that data computed by said computing unit is in a predetermined range.

8. The camera according to claim 6, which further comprises at least one of an electronic iris and an automatic gain control circuit.

9. An apparatus for visual recognition of surroundings of a vehicle, comprising:
- a housing mounted in a front portion of a vehicle and provided with a plurality of entrance windows through each of which extraneous light rays are taken in from the surroundings of said vehicle;
- an image pickup device mounted in said housing so that an imaging plane thereof faces a region located in front of said vehicle;
- an optical element that is disposed in said housing and is operative to form images obtained from said extraneous light rays taken in through the plurality of entrance windows on said imaging plane of said image pickup device;
- a light shielding member that is provided in such a way as to be upright on said imaging plane of said image pickup device and to divide said imaging plane of said image pickup device into imaging fields on which images are respectively formed from said extraneous light rays taken in through the plurality of entrance windows;
- an aperture limitation member which is placed in a stage preceding said light shielding member and has an aperture for limiting a size of an incidence optical path of each of extraneous light rays from which images are formed on the imaging plane of said image pickup device;
- a diaphragm member that is disposed in the stage preceding said light shielding member in such a manner as to be able to move in a direction perpendicular to an optical axis, for regulating the quantities of incident light of said imaging fields by overlapping with said aperture in the direction of the optical axis;
- drive means for moving said diaphragm member in a direction perpendicular to the optical axis; and
- display means for displaying an image signal representing said images formed on the imaging plane of said image pickup device.

10. The apparatus for visual recognition of surroundings of a vehicle, according to claim 9, which further comprises:
- a computing unit for computing a difference between data respectively represented by output signals outputted from said imaging fields of said image pickup device; and
- a control unit for driving and controlling said drive means in such a manner that data computed by said computing unit is in a predetermined range.

* * * * *